(12) United States Patent
Li et al.

(10) Patent No.: US 12,417,249 B2
(45) Date of Patent: Sep. 16, 2025

(54) SMART FIND FOR IN-APPLICATION SEARCHING

(71) Applicant: Microsoft Technology Licensing, LLC, Redmond, WA (US)

(72) Inventors: HongQiao Li, Bellevue, WA (US); Bernhard Kohlmeier, Seattle, WA (US); Xiaosong Yang, Bellevue, WA (US); Le Yu, Kenmore, WA (US); Lin Song, Sammamish, WA (US); Hao Mi, Redmond, WA (US); Derik Bjorn Stenerson, Redmond, WA (US); Seok Woo John Kim, Bellevue, WA (US); Robyn Sambo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1022 days.

(21) Appl. No.: 16/847,622

(22) Filed: Apr. 13, 2020

(65) Prior Publication Data
US 2021/0319068 A1 Oct. 14, 2021

(51) Int. Cl.
*G06F 16/9032* (2019.01)
*G06F 16/903* (2019.01)
(Continued)

(52) U.S. Cl.
CPC .......... *G06F 16/90332* (2019.01); *G06F 16/90344* (2019.01); *G06F 16/93* (2019.01); *G06N 20/00* (2019.01)

(58) Field of Classification Search
CPC ......... G06F 16/90332; G06F 16/90344; G06F 16/93; G06F 16/36; G06F 16/313; G06N 20/00; G06N 3/006
See application file for complete search history.

(56) References Cited

U.S. PATENT DOCUMENTS

| 2002/0002550 A1* | 1/2002 | Berman | ................ G06F 16/583 707/E17.02 |
| 2012/0047130 A1* | 2/2012 | Perez | ..................... G06Q 10/00 707/723 |

(Continued)

FOREIGN PATENT DOCUMENTS

WO    WO-2009090498 A2 *  7/2009  ....... G06F 17/30684

*Primary Examiner* — Apu M Mofiz
*Assistant Examiner* — Oscar Wehovz
(74) *Attorney, Agent, or Firm* — CALFEE, HALTER & GRISWOLD LLP

(57) ABSTRACT

An in-application search service receives a query from a user attempting to locate information within a document. If a current index and current vector table do not exist, a content indexing service produces an index and a vector table based on the current content of the document. The vector table is based on semantic models that have been pre-trained. The query is tokenized and one of three different processing paths are taken based on the length of the tokenized query. For a single term query, a semantic search and prefix search are performed and the results are combined. If the length of tokenized query exceeds a threshold, a semantic search produces the results. Otherwise, search results are produced based on both prefix fanout and semantic fanout. Results are deduplicated, snippets are extracted, and the results and/or snippets are presented to the user.

20 Claims, 12 Drawing Sheets

(51) Int. Cl.
*G06F 16/93* (2019.01)
*G06N 20/00* (2019.01)

(56) References Cited

U.S. PATENT DOCUMENTS

| | | | |
|---|---|---|---|
| 2015/0269175 A1* | 9/2015 | Espenshade | G06F 16/90324 706/47 |
| 2016/0179945 A1* | 6/2016 | Lastra Diaz | G06F 16/284 707/739 |
| 2016/0246851 A1* | 8/2016 | Abe | G06F 16/3334 |
| 2016/0357842 A1* | 12/2016 | Kohlmeier | G06F 16/2477 |
| 2019/0354544 A1* | 11/2019 | Hertz | G06N 5/025 |
| 2020/0167329 A1* | 5/2020 | Raphael | G06F 16/2272 |
| 2021/0056150 A1* | 2/2021 | Karandish | G06F 16/3329 |
| 2021/0200956 A1* | 7/2021 | Ding | G06F 40/30 |
| 2021/0294970 A1* | 9/2021 | Bender | G06F 16/3329 |
| 2021/0295822 A1* | 9/2021 | Tomkins | G06F 16/328 |

* cited by examiner

SMART FIND FOR IN-APPLICATION SEARCHING

FIELD

This application relates generally to search techniques. More specifically, this application relates to in application searching.

BACKGROUND

Out of application searching is centered around finding a relevant document, web site, and so forth. In application searching is centered around finding content within a document once the document has been opened in an application, such as for viewing or editing. For example, a user may submit a query to search capability that is part of an enterprise or operating system to attempt to locate a document relevant to the user's query. Once the potentially relevant document is located, the user then opens the document and submits a query to the in-application search capability to attempt to locate a location within the document that is relevant to the query.

It is within this context that the present embodiments arise.

DETAILED DESCRIPTION

Figure 1:
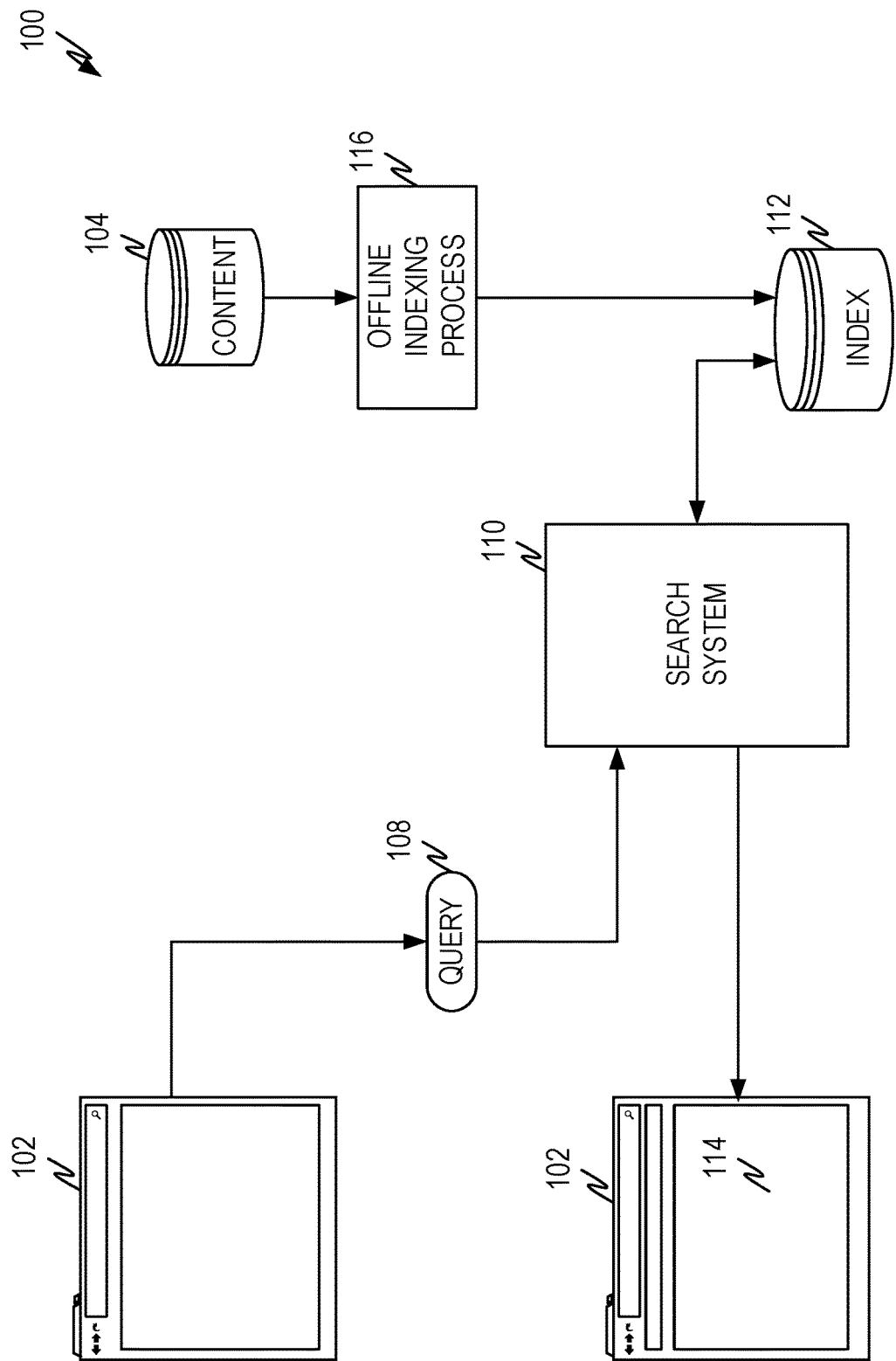
FIG. 1 illustrates an example architecture diagram according to the prior art.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

The traditional search experience is designed to identify documents that are relevant to the submitted query. Once a relevant document is located, in-application search locates relevant and/or desired information within the document. In the context of this disclosure, in-application search refers to searching within a document, usually from within an application such as an office productivity application (e.g., word processor, presentation software, spread-sheets and so forth). The search function is often accessed via a menu or other user control that is activated by the user. The user can then enter a query or query prefix that specifies the information that the user wishes to find within a document. Thus, while the traditional search experiences is centered on finding the "right" document, in-application search is centered on finding information within a document.

Current in-application search is often a frustrating experience. The current in-application search experience relies on exact matching. Thus, if a user does not enter the exact information as specified in the document, the information will not be found by the in-application search. Typically, in-application search is unable to handle the following situations:

1. Typographical errors. When there is a misspelling, either in the query or in the document content, the in-application search will be unable to find the relevant places in the document.
2. Forms of Words. Where there are different forms of the words in the query and the document, users will need to type each form of the word to identify all places in the document where content having different forms of a word can be found. Thus a user searching for "technology" will not locate places in the document that discuss "technologies." Other examples include USA and U.S.A., newborn and new born and new-born, and so forth.
3. Multi-word queries. A single word or a prefix may lead to too many search results for users to locate the specific content. Thus, a user searching for "oil" in a document may be overwhelmed by irrelevant content. While a query such as "oil price" may miss similar content such as "price of oil," "prices of the oil," "cost of oil," and so forth. Thus, a user is often caught between too much and too little information.
4. Natural language queries. While recent breakthroughs have allowed deep learning techniques to provide the capability of handling natural language queries, in-application search lacks the capability to extract intent(s) from natural language queries and use the extracted intent(s) to identify what the user intends to accomplish or means by the natural language query.

While web search solves many of these issues when locating documents, the solutions in web searching rely on information that is simply unavailable in an in-application search or inapplicable to in-application search. For example, locating relevant documents in web searching relies on rich metadata provided by web sites and other content publishers, the actions of millions of users (e.g., what web sites do users typically click on after entering a particular query), number of clicks on a web site (e.g., page ranking based on number of clicks), which queries are most often entered, and/or the significant processing power that can be brought to bear by web-scale data centers. These, and many other items, are either unavailable or irrelevant to in-application search capability. Thus, it is not sufficient to simply take prior solutions in the web search area and attempt to apply them to in-application search. Such an approach would not succeed as the information that web search solutions depend on do not exist when attempting to locate relevant information in a particular document, such as those created by users in office productivity applications.

Embodiments of the present disclosure take advantage of deep learning based natural language semantic representations, query understanding, and document indexing to provide a rich in-application search experience. Some embodiments of the in-application search experience receive information from the application as to what document is being displayed and when changes are made to the document. Unlike traditional search experiences, a document index is not built ahead of a query being entered by a user, although a previously generated query can be reused for a currently received query if the document remains unchanged since the last query was entered.

When a user enters a query, the intent for any natural language queries can be extracted and/or queries analyzed to extract relevant search terms. Unlike traditional systems where indexes are built before a query is entered, embodiments of the present disclosure do not build the index and semantic models until an indication is received from the user that the user intends to search the document. Once such an indication is received, a content indexing service builds an index and a vector table using semantic models for the document. The index is searched based on the search terms. The results include locations and portions of the document where search terms are located. The vector table is searched based on a vectorized version of the query to extract semantically similar information. The results of the semantic search include locations and portions of the document where semantically similar information can be found.

The search term results and the semantic search results can be combined, ranked, and a subset of the results presented to the user.

Additionally, or alternatively, a question and answer module can locate locations in the document where answers to questions entered by the user can be found. Thus, if a user enters the query "can I bring my dog to work?," the question and answer module can utilize the document context, the index, and/or vector table to directly extract the answer from the opened document if it exists. Such answers are sometimes referred to as "quick answers" or "direct answers."

Some embodiments of the present disclosure can call upon other search providers to prevent users from hitting "dead ends" in their search experience. Thus, if the user enters "can I bring my dog to work?" and the answer cannot be found in the current document, the query can be passed to another search provider to locate a document where the answer can be found. Afterward, the in-application search service can locate the correct information in the document and present the results and/or quick answer to the user.

These and other aspects are explained more fully below.
Description

FIG. 1 illustrates an example architecture diagram 100 according to the prior art. This architecture depicts how a typical search service operates. An index 112 of content 104 is created by an offline indexing process 116 to create the index(es) needed for the search service 110 to operate. The index is created prior to any searches being performed.

Once the index is created, it is available for use. A user, typically using a client program 102, enters a query 108, which is submitted to the search service 110. The search service 110 utilizes the index 112 to perform a search and produce a set of search results. The search results are typically in the form of a URL or other locator information that allows a user to locate a document, web page, or other publication represented by the corresponding search result. The search results are returned to the user and displayed 114 in the client program 102.

The overall goal of the search service 110 is to allow a user to find the "right" document. The search service 110 does not display much, if any, information regarding the content inside the document. The information that is displayed typically relies on metadata, summaries, and so forth provided by the content publisher. Such information provided by the content publisher can be incorporated into the index so that it can be provided as part of the search results.

Figure 2:
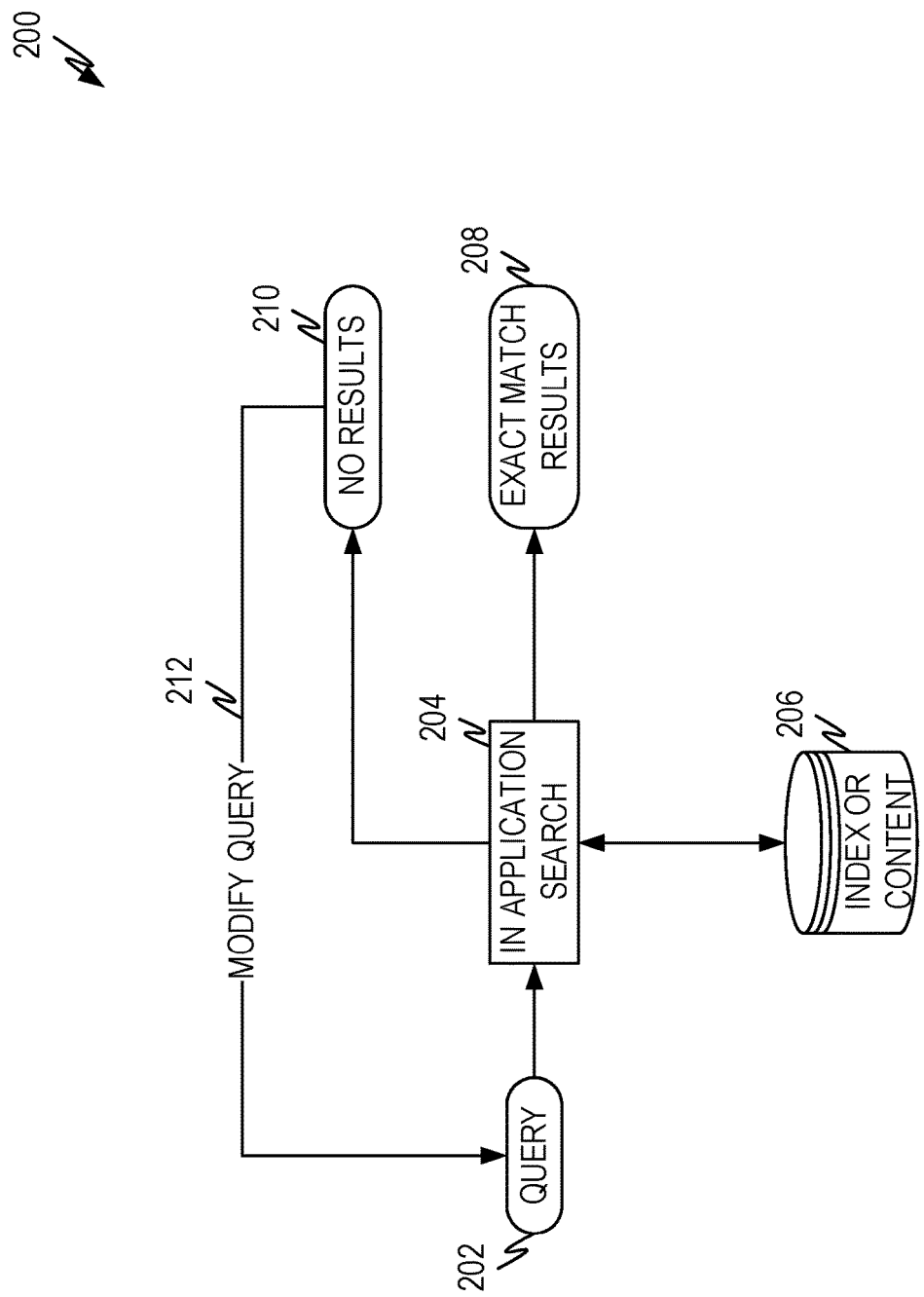
FIG. 2 illustrates a conceptual representation of an in-application search experience according to the prior art.

FIG. 2 illustrates a conceptual representation of an in-application search experience 200 according to the prior art. In contradistinction to the search service 110 of FIG. 1, which is concerned with allowing a user to find the "right" document, the in-application search experience of FIG. 2 is designed to allow a user to locate information that is contained within a document. Another term for in-application search could be in-document search. As discussed above, in the context of this disclosure, in-application search refers to searching within a document, usually from within an application such as an office productivity application (e.g., word processor, presentation software, spread-sheets and so forth).

The prior art in-application search experience can be frustrating for users. As previously discussed, the prior art in-application search experience relies on exact matching and thus is unable to account for things like differences in spelling between the document and the query, different forms of words between the document and the query, multi-word queries, and/or natural language queries.

In prior art in-application search services, a user submits a query 202 to the in-application search service 204. The in-application search service 204 performs a string match against the query 202, such as by using an index and/or the content of the document as shown by 206. If the service 204 finds a match, the exact match search results 208 are displayed. If no exact match is found, there will be no results found 210 and the user has no alternative but to modify the query 212 and resubmit the modified query to the service 204.

Thus, prior art in-application search services can be frustrating experiences for users since they need to know that the document contains the exact string they are searching for before any results can be located.

Figure 3:
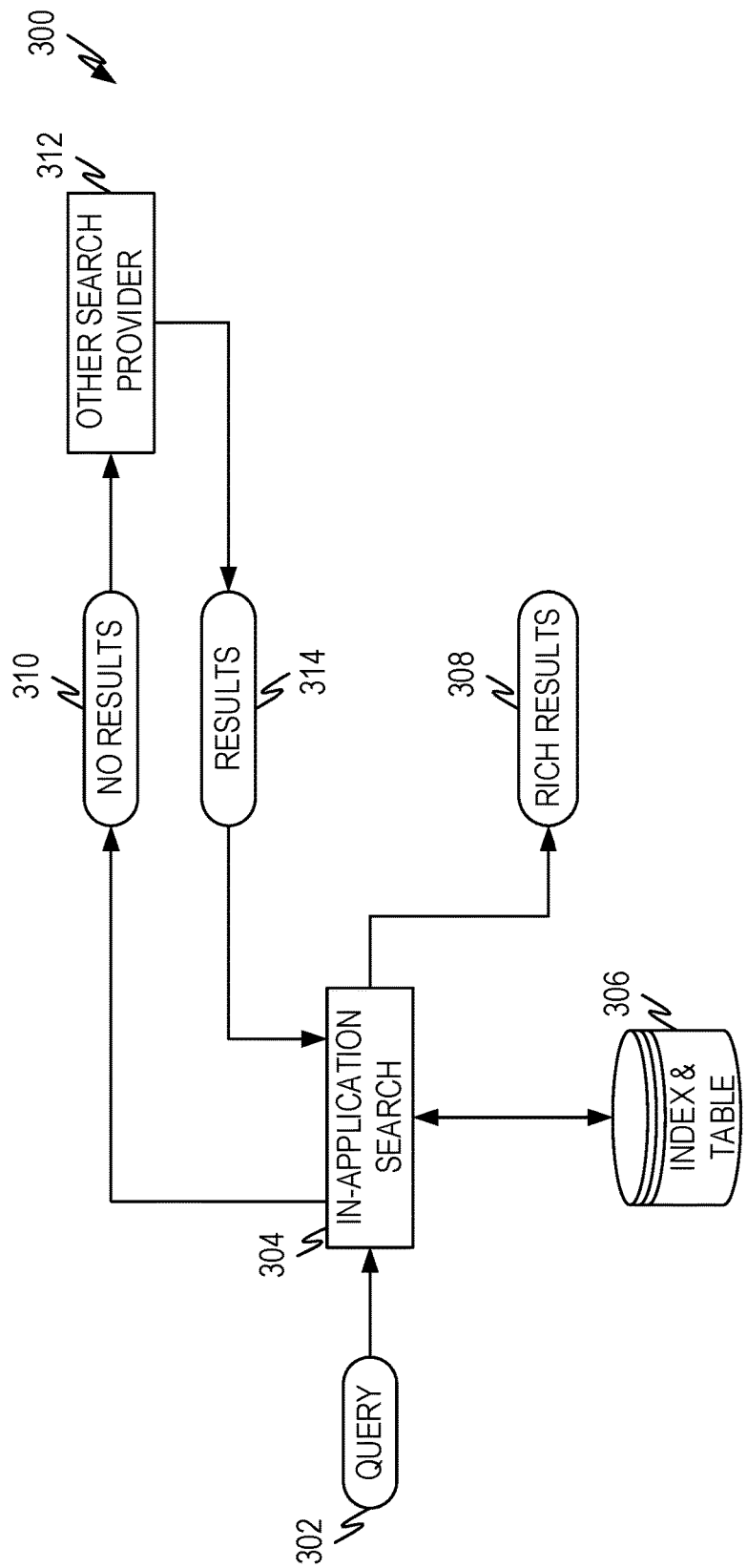
FIG. 3 illustrates a conceptual representation of an in-application search experience according to some aspects of the present disclosure.

FIG. 3 illustrates a conceptual representation of an in-application search experience 300 according to some aspects of the present disclosure. In contradistinction to the prior art in-application search services, the in-application search services of the present disclosure solve problems in the prior art by presenting rich search results that contain not only exact matches, but also semantically similar results. Additionally, in some embodiments, quick answers can also be extracted from the document to directly answer a query. These and other results are illustrated by rich results 308. The details of rich results 308 and how they are produced is discussed below. Furthermore, the search process and how the index and table 306 are generated and utilized is described below.

Additionally, or alternatively, the in-application search service 304 can call (or be called by) other search providers 312 in order to prevent the "dead end" phenomenon experienced by prior art in-application search services. This capability enables several scenarios that cannot be handled by prior art search services and directly improves search technology.

In one representative example, suppose a user is searching to know whether they can sign up for their employee stock purchase plan after the beginning of a quarter, or whether they have to wait until the beginning of the next quarter. Reasoning that the answer is likely to be found in the employee handbook, the user opens the handbook and searches for "can I sign up late for the employee stock plan?"

In a prior art in-application search service, this would almost certainly yield "no results." First, because prior art in-application search services do not take natural language query inputs. Second, because even if the information exists in the employee handbook, it likely does not refer to the employee stock purchase plan as the employee stock plan.

In embodiments of the present disclosure, semantic search capability would allow all semantically similar references to "employee stock plan" to be located in the document. Thus, embodiments of the present disclosure can locate similar references such as "employee stock purchase plan" and "ESPP" and so forth. These results, along with exact matches of "employee stock plan" can be identified in the document and presented to the user.

Suppose, however, that the employee handbook does not contain any information on the employee stock purchase plan and that such information was contained in a separate benefits handbook. In some embodiments of the present disclosure, when a "no results" 310 event occurs, the query can be submitted to additional search providers 312 in an attempt to locate relevant information for the user.

A user generally has access to several search services. For example, the in-application search capability that is discussed herein is tailored to identifying relevant information within an identified document. If a user was searching for a document on a local machine, the user may choose to either locate the document by browsing or by using a search service that is part of the underlying operating system. These search services are designed to locate particular documents on the local machine and/or external/cloud storage accessible by the local machine. For documents residing within the enterprise, a user may use an enterprise search service to find documents within the enterprise. Finally, there are several web search services to find information on the internet.

In the scenario, where the information is not found in the current document (i.e., no results 310), the in-application search service 304 can call other search services in a hierarchical manner. For example, the in-application search service 304 can call the local search service. If no documents are found and/or the documents found do not contain the information sought by the user, the in-application search service 304 can call the enterprise search service, and so forth until a web search service is called.

In a first variant, suppose that the information sought by the user was not found. In some embodiments, the service 304 can inform the user that no results were found in the document. The service 304 could then either proactively without input from the user, or upon activation of a control by the user, search locally for relevant documents by calling the local search service. When the search results 314 come back, the service can determine if relevant documents were found. If so, the service 304 can identify the most likely document and perform an in-application search as described herein. The most likely document can be identified in several ways. For example, the top ranked search result can be used. Other criteria can also be used such as the most recent document, the document with a creation/modification date that is the most similar to the opened document, and/or other criteria.

If results are found in the document, they can be presented to the user along with an indication of the document they are found in. If no results are found, the process can be repeated with the next most likely document, and so forth.

In a second variant, rather than selecting documents one-by-one and performing in-application searches, the service can pick the top N most likely documents and perform in-application searches on each and present the results for all N documents. In this variant N is at least one. The upper limit on N can be set at how long it takes to perform an in-application search, selecting N such that the delay as perceived by the user is within a threshold time period selected based on the user's tolerance for delay.

If no documents are found locally, but the enterprise search service returns results 314, the in-application search service 304 can operate according to the first and/or second variant above using the enterprise search results. If results are found, they can be presented along with an indication of which document they can be found in.

If no results are found in the enterprise, or upon command of the user, a web search can be performed using one or more web search services.

In this way, the user is very unlikely to reach a "dead end" as in prior services.

Figure 4:
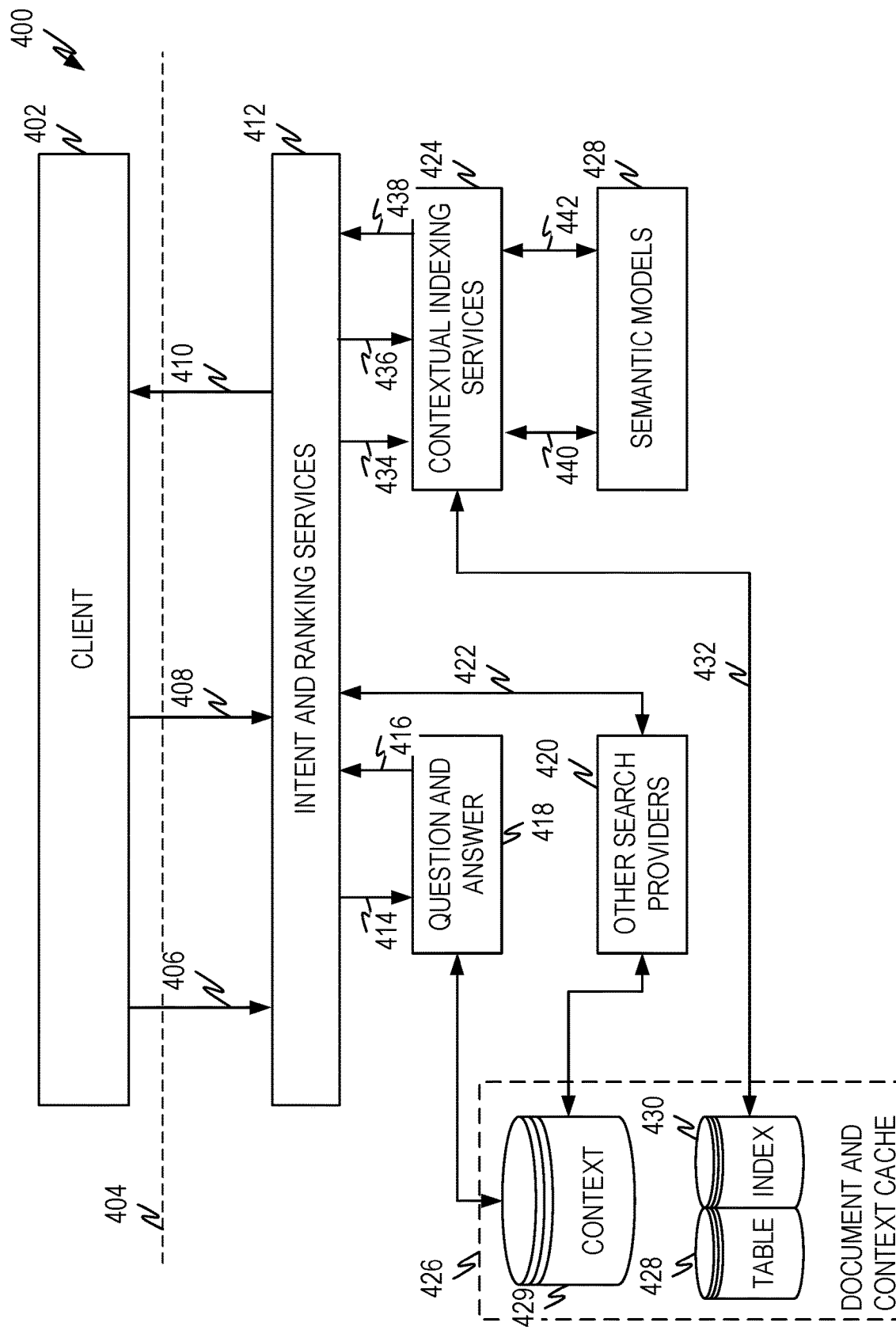
FIG. 4 illustrates an example architecture diagram according to some aspects of the present disclosure.

FIG. 4 illustrates an example architecture diagram 400 according to some aspects of the present disclosure. The architecture diagram 400 depicts one example of an in-application search architecture according to the present disclosure. In this architecture, the in-application search service is implemented as a service accessible to the client application 402. The dividing line 404 illustrates the client side and service side.

When the user opens a document within the client application 402, the client application 402 identifies the document to the service as illustrated in 406. If the service has access to the document, such as when a document is stored in a location (e.g., the cloud) that the service has access to, the service can retrieve the document from the location. Otherwise, the client application 402 can send the document to the service.

In one embodiment, the service can begin processing the document. However, in other embodiments, the service does not begin processing the document until it receives an indication that the user intends to perform a search. Such an indication can include, but is not limited to, receiving a search query from the client, receiving an indication of an interaction the user performs such as selecting a search box, beginning to enter a search query, or any other interaction the user performs that indicates the user intends to perform a search, and/or other indications.

When the indication is received, the service uses the contextual indexing services 424 to build an index 428 and vector table 430. The index 428 can be a trie and/or any other form of index that allows a term search to be performed. In one example, a prefix tree can be built and used. In the context of this disclosure, a term search means searching for any term, phrase, partial term, and so forth within the document. How the index 428 is built and/or annotated is discussed below.

The vector table 430 can be a table and/or any other form of structure(s) that allow a semantic search to be performed. In one example, the vector table consists of a vector space where words, phrases, sentences, paragraphs, and/or other segments of a document are converted to a vector. The vectors are created in such a way that words, phrases, sentences, paragraphs, and so forth that are semantically similar are close in the vector space. How the vector table 430 is created is discussed below.

Creating the index 428 and vector table 430 is a relatively quick process, so building the index 428 and the table 430 need not be started before the query is received.

When a query is received as indicated by 408, the intent and ranking services 412 extract an intent and/or search terms from the query. The intent, search terms, and/or query are passed to the contextual indexing services 424 along with the document and/or an identification as to where the document can be found as indicated by 434 and 436.

The contextual indexing services 424 build the index 428 and table 430 if needed (see FIG. 5) and the index 428 and table 430 are saved 426. The contextual indexing services utilize semantic models 428 to vectorize the query and document as indicated by 440 and 442. The process is described below. The contextual indexing services 424 then perform a term search and semantic search as described herein and return the results as indicated by 438.

Some search queries lend themselves to direct answers. For example, queries such as "How tall was George Washington?," "Can I enroll late to the employee stock purchase plan?," "Can I bring my parrot to work?," and others are amenable to a direct answer (e.g., "6 ft. 2 in.," "Yes," and "No, unless you are a pirate," respectively).

When a query arrives, intent and ranking services 412 evaluates the query and determines whether the query is amenable to a direct answer. In one example embodiment any natural language query is also considered to be amenable to a direct answer. In another example embodiment, a natural language type query can be created from an input query and then considered to be amenable to a direct answer. Methods to identify which queries are amenable to direct answers are known and any such method can be used in embodiments of the present disclosure.

The query is submitted to question and answer processing 418 as indicated by 414 and the results are returned to the intent and ranking services 412 as indicated by 416. Question and answer processing 418 can utilize any method of processing queries and extracting direct answers from the document. For example, Microsoft provides a service currently entitled Project Turing, which uses Turing Natural Language Representation (TNLR) to extract direct answers from a segment of a document. Project Turing is trained using a 17 billion parameter language model to perform natural language processing tasks, including extracting direct answers. Other models for extracting direct answers to a query from a segment of text could also be used in embodiments of the present disclosure.

The question and answer processing 418 take as an input the query 414 and one or more segments of a document, as represented by context 429. For example, the semantic search and/or term search can identify segments of the document where relevant information is likely to be found. A subset of the segments can be stored in context 429. The question and answer processing 418 then utilizes the query 414 to examine the segments and extract direct answers 416, which are then returned to the intent and ranking services 412.

The intent and ranking services 412 receives the term search results 416, the semantic search results 438 and/or term search results 438 and ranks them using one or more ranking processes to extract the most relevant results that will be presented to the user. The results can be ranked in the aggregate, or each type of result can be ranked individually and then results that meet a relevance criterion can be presented to the user. The relevance criteria can comprise selecting the topmost relevant results for each category, presenting results above a certain relevance score up to a fixed number of results, combinations thereof, or any other relevance criteria that yields results that a user would consider useful.

How results are presented in an example embodiment is discussed below.

As discussed above, the service can also utilize other search providers 420 to perform additional searching. In one example embodiment, other search providers 420 can be utilized upon occurrence of defined criteria, such as a user asking for additional searching using one or more other search providers, the service not finding relevant results in the current document, and/or other criteria. In some instances, the service can send the query to other search providers 420. In other instances, one or more context segments 429 can be sent to the other search providers 420. In still other instances, a combination thereof can be sent to other search providers 420. Furthermore, when other search providers 420 are used, one or more of the search providers can be used.

When one or more other search providers 420 are used, the results can be provided back to the intent and ranking services 412 which can either use a ranking provided by the other search provider, or can re-rank the results along with other results to determine what to present to the user. The intent and ranking services 412 can utilize any method to rank and/or re-rank results.

Figure 5:
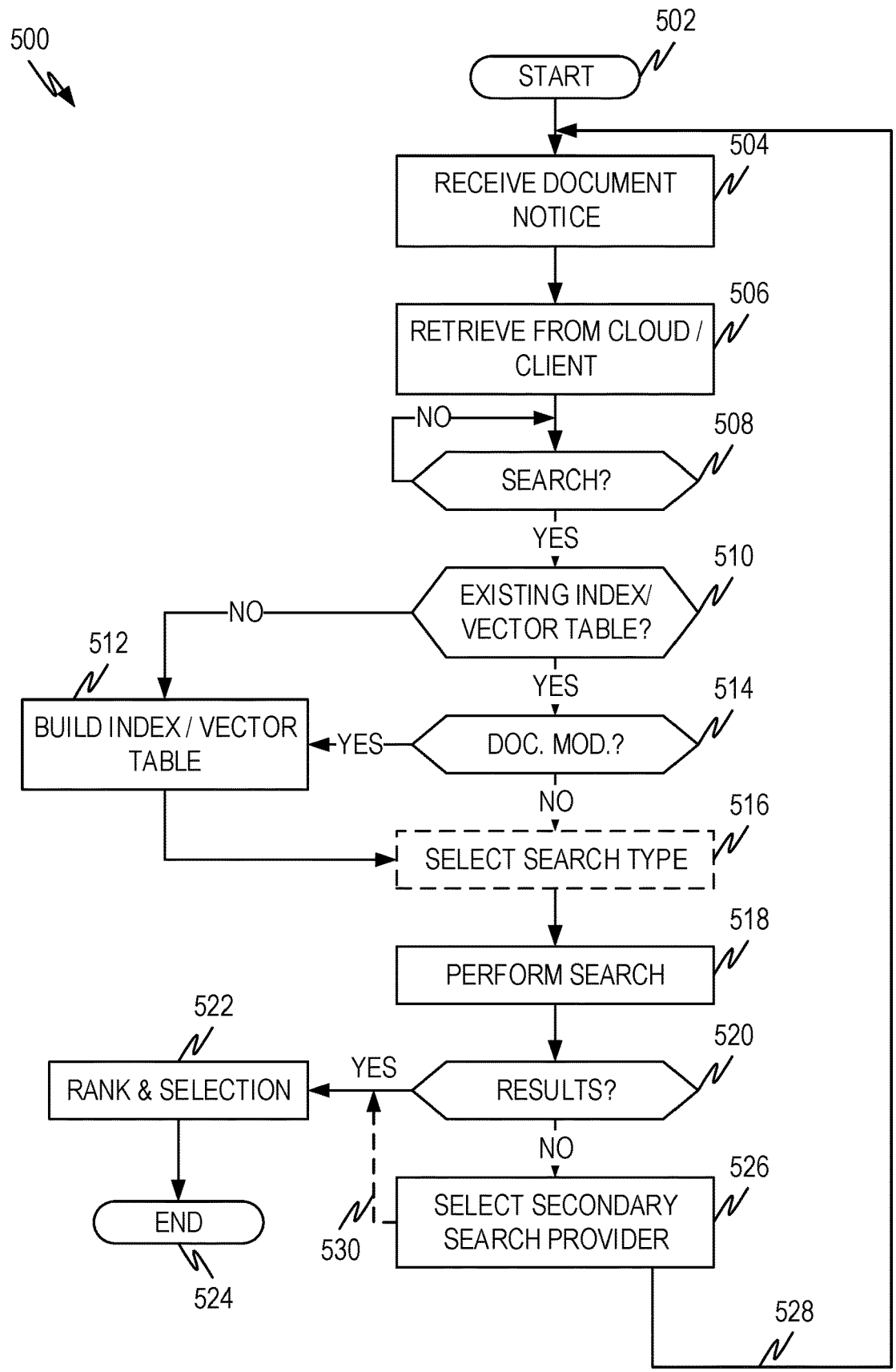
FIG. 5 illustrates an example flow diagram according to some aspects of the present disclosure.

FIG. 5 illustrates an example flow diagram 500 according to some aspects of the present disclosure. For example, the flow diagram 500 can describe how an embodiment of the architecture in FIG. 4 operates.

The flow diagram begins at 502 and proceeds to operation 504. In operation 504, the in-application search service receives identification of the document that the user is working on. For example, when a document is opened in an office productivity application, the application can send to the in-application search service identification of the document. The identification can include any information that identifies the document and/or identifies where the document can be located, such as a URI/URL.

In operation 506, the service retrieves the document from the cloud and/or obtains the document from the client.

Operation 508 waits until an indication is received that a user intends to perform a search. Examples of such a search indication has been previously discussed.

Note that when the document text changes, operation 506 will need to be performed again so that the in-application search service is operating on the current document. Upon change, the entire document can be retrieved, or only the changes can be provided to the in-application search services and the changes applied to the document.

In one optimization, the order of operation 506 and 508 can be reversed so that the document is not retrieved until a search is performed. The benefit of this approach is that the current document is retrieved when a search is to be performed and no wasted bandwidth is used retrieving documents that are never searched. The cost in some instances is a slight delay in beginning processing until the document is obtained.

Operation 510 identifies whether an existing index and vector table are available and operation 514 determines whether the document has changed since the existing index and vector table were created. When an index and vector table are created for a document, they can be cached on the in-application search services so that they can be utilized if the document hasn't changed since the index/vector table were created.

Office productivity applications note changes by raising a "document change" event. The in-application search service can hook such events and invalidate or delete existing index and vector tables for a document when the document changes. In other embodiments, the office productivity application can simply inform the in-application search service when the document changes so that the in-application search service can invalidate or delete the existing index and vector table for the document.

If an existing index and vector table are available and have not been deleted or invalidated, execution can proceed to operation 516 and/or 518. Otherwise, operation 512 is performed where the index and vector table for the document are created as described herein.

Operation 516 is shown as optional. Operation 516 can be used in some embodiments to identify which types of search (term, semantic, question and answer) should be performed. In these embodiments, the service can select types of search based on various criteria. For example, the user may have indicated that only a term search should be performed. In another example, the service can evaluate the query and determine whether some types of searches should be performed such as a question and answer search. In still other embodiments, the user can indicate whether one or more other search providers can be used and under what conditions. In still other embodiments, any combination of the preceding can be used.

Operation 518 performs the appropriate searches as described herein and the results examined. If there are no results, and/or upon meeting other criteria as described herein, one or more secondary search services can be engaged and the results either added to the existing results (530) or one or more document selected 528 and submitted to the in-application search process.

All the results from all the different documents, search services, and so forth can be collected and operation 522 ranks and selects the results that will be presented to the user, as described herein.

The diagram ends at operation 524 with the results being presented to the user as described herein.

Figure 6:
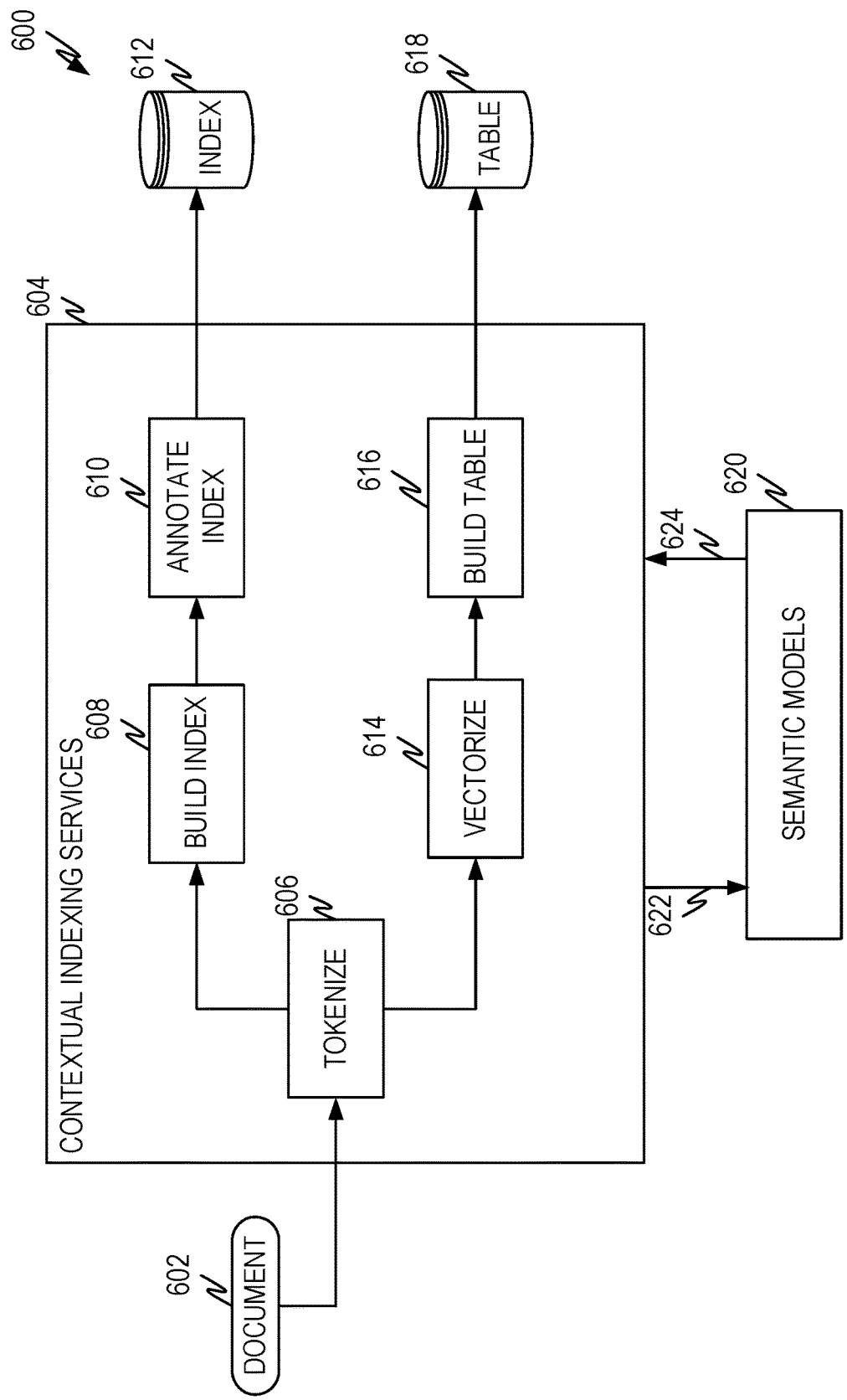
FIG. 6 illustrates an example architecture diagram according to some aspects of the present disclosure.

FIG. 6 illustrates an example architecture diagram 600 according to some aspects of the present disclosure. The architecture 600 illustrates how contextual indexing services 604, such as contextual indexing services 424 of FIG. 4, operate in some embodiments.

The document 602 represents the document from which the index 612 and vector table 618 is to be created.

Operation 606 tokenizes the document 602. Tokenization means to break the document into segments that will be used to create the index and vector table. The segments can include one or more of a character, a word, a phrase (multiple words and/or partial words), a sentence, a paragraph, and/or any other segment of the document. Thus, tokens can be produced where each word in the document is represented. Phrase tokens, each representing a phrase can be produced, and so forth for each segment of a document. These tokens can either be combined or can be separated and processed individually as described. For example, to build an index that comprises a prefix tree, a tree is generated so that each character, word, phrase, sentence, paragraph, and so forth found in the document are represented in the tree. Similarly, vector tables for each word, phrase, sentence, paragraph and so forth can be created and then combined.

The tokenized document is utilized to build the index as indicated by operation 608. For example, the tokenized document is used to build a prefix tree, also referred to as a trie. It is known how to build a prefix tree from a tokenized document and no further disclosure need to be given on this process.

Once the prefix tree (or other index structure) is created, the prefix tree is annotated. For example, nodes of the prefix tree can be annotated with TF-IDF values, synonyms, and so forth to be used in term searching. TF-IDF is a weighting factor that defines how "unique" a node of the prefix tree is. Considering words for the moment, the TF-IDF weighting for a word is proportional to how often a word is found in a document. Thus, words that occur less often are weighted higher than words that occur more often. Calculation of TF-IDF is well known and need not be described further.

Annotating the prefix tree with synonyms allow not only exact matching, but matching for synonyms within the prefix tree. Thus, a phrase like "can I enroll" can be matched with "can I sign up" where sign up is an annotated synonym for enroll.

The index can also be annotated with other scores or items if desired.

The annotated index is then stored as the index 612.

Building a vector table for semantic search comprises vectorizing the tokenized document as indicated by vectorize operation 614. The vectorization process takes a tokenized segment and converts it into a segment that has a location in the vector space that is close to semantically similar segments. For example, a vectorized word would be close to semantically similar words in vector space. A vectorized phrase would be close to semantically similar phrases in vector space, and so forth for all the different segments (word, phrase, sentence, paragraph, and so forth).

There are several ways to vectorize the tokenized document. For example, Word2vec is a well-known set of models that create vectorized segments. Another mechanism that can be used is AGI encoding. Basically, any vectorization process can be used as long as semantically similar tokens are close in the resultant vector space. The vectorization process thus utilizes semantic models 620 (e.g., Word2vec, AGI encoding). The appropriate segment of the tokenized document is passed to the semantic encoding model 620 as shown by 622 and the resultant vector is returned as shown by 624.

Once the various segment levels of the tokenized document have been vectorized via vectorization 614, the resultant vectors are compiled into a vector table as shown by 616. The table can take any form as long as it supports semantic search. Although the resultant output is referred to as a vector table 618, other data structures can be utilized. In order to perform a semantic search using the table, the query (or some aspect(s) of the query) is turned into a vector (query vector) and the table is searched for entries that are within a given distance from the query vector. Distance can be calculated as the Euclidian distance, or any other desired distance. The segments corresponding to the returned vector entries are then identified.

Figure 7:
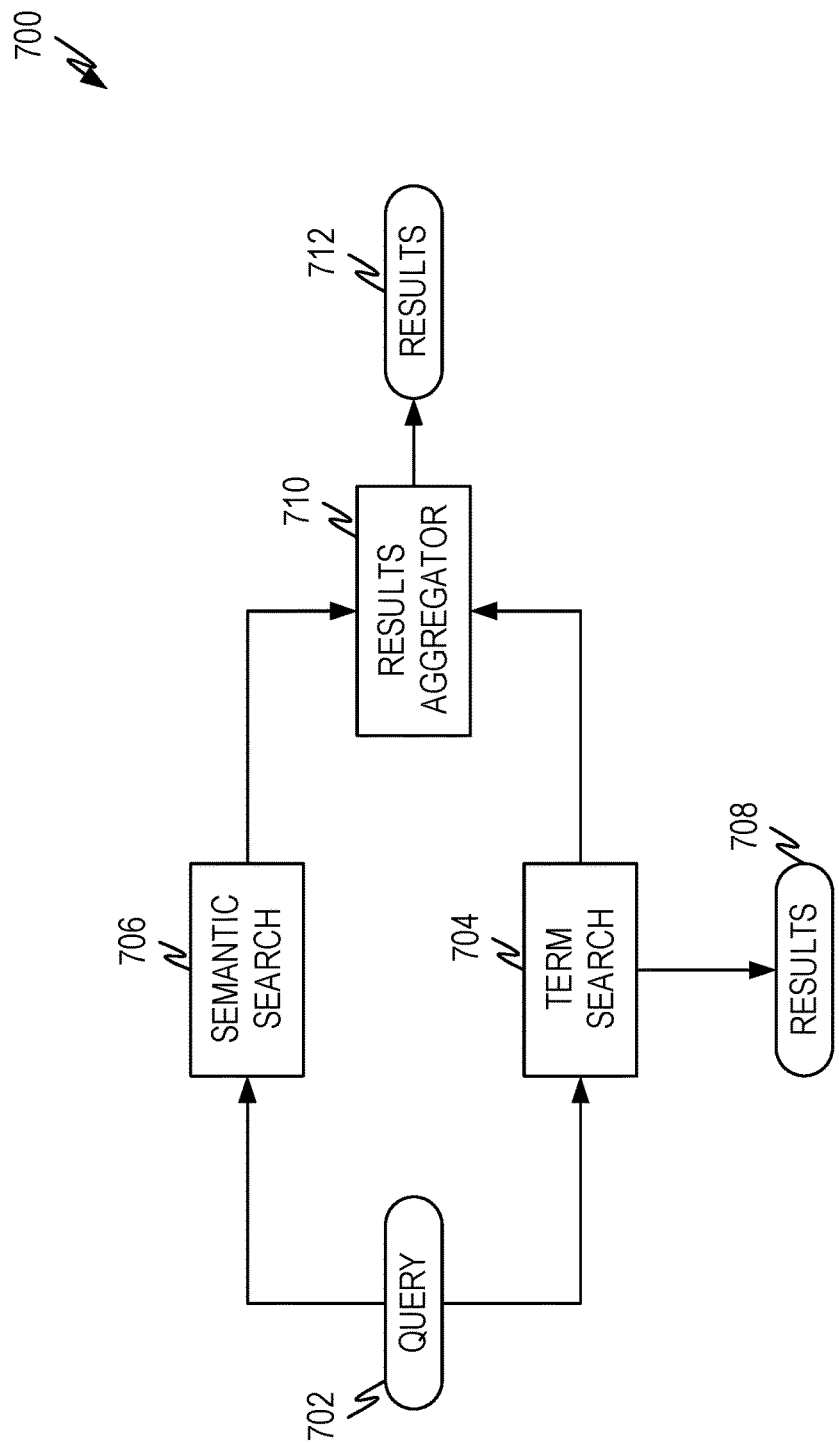
FIG. 7 illustrates an example architecture diagram according to some aspects of the present disclosure.

FIG. 7 illustrates an example architecture diagram 700 according to some aspects of the present disclosure. This high-level diagram shows that embodiments of the present disclosure can perform a combination of both semantic search and term search and aggregate the results for presentation to the user.

For example, in one embodiment, the in-application search service receives a query 702. Upon direction by the user, the service can perform a term only search 704 and return the results 708. Thus, the client application (e.g., a productivity application) can have a selectable control to allow the user to only request a term only search.

In the absence of specific direction to only perform a term search, the in-application search service can perform both a semantic search 706 and a term search 704 and aggregate the results 710. The results aggregator 710 can rank and select which results are to be presented to the user prior to actually presenting the results to the user, such as have been previously described. Because both a semantic search 706 and a term search 704 are performed, the results 712 will be rich results in that they will avoid or ameliorate many of the problems that exist in prior art in-application search services. Thus, both exact results and semantically similar results will be considered when selecting which results are relevant enough to return to the user.

Figure 8:
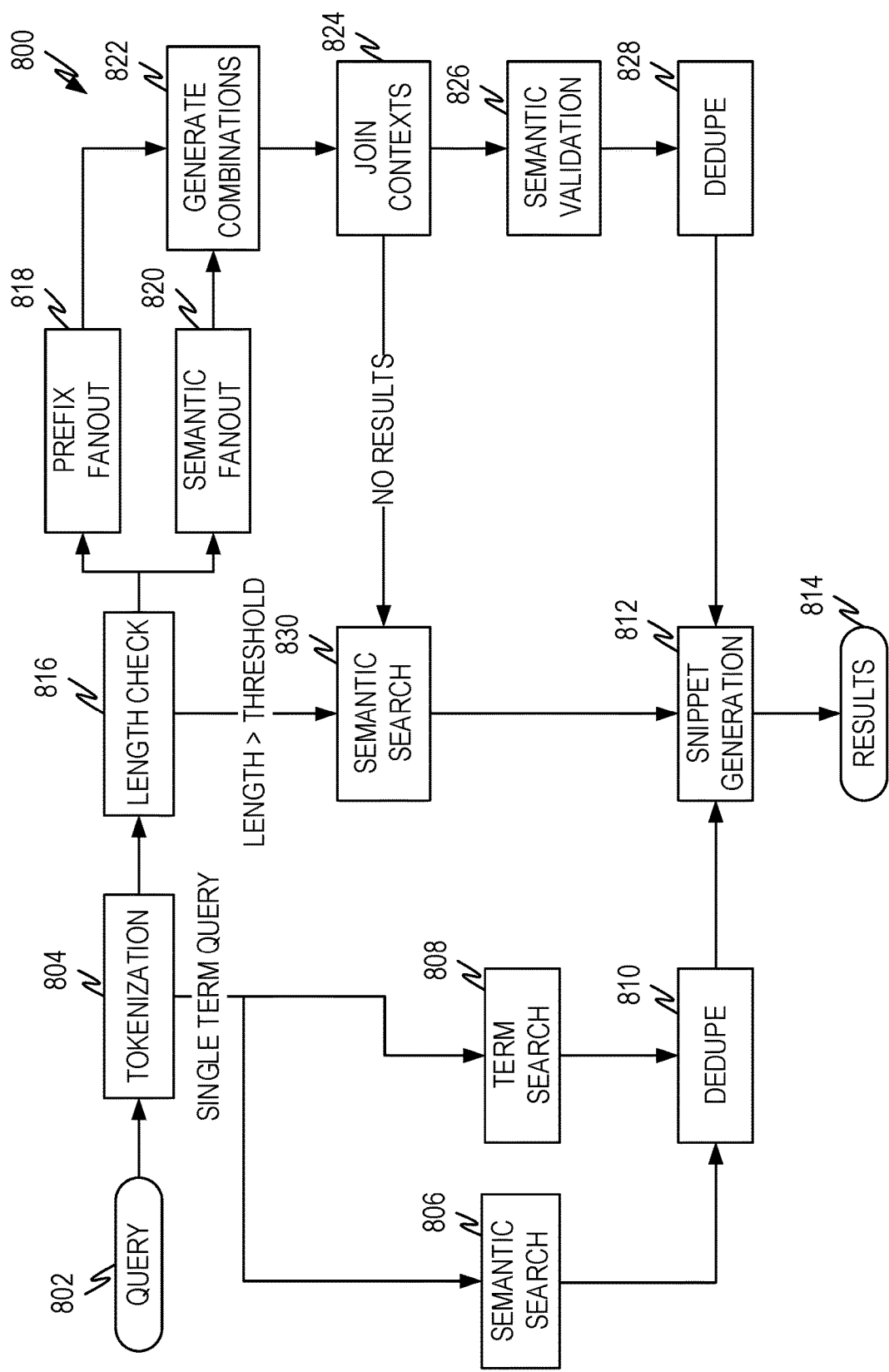
FIG. 8 illustrates an example architecture diagram according to some aspects of the present disclosure.

FIG. 8 illustrates an example architecture 800 diagram according to some aspects of the present disclosure. This architecture is an example of how the searching (e.g., semantic and/or term) can be performed, such as by the contextual indexing services 424 of FIG. 4. This architecture does not cover the question and answer searching previously discussed.

A query 802 is received and tokenized by operation 804. Tokenization, as previously discussed, is breaking the query down into various segments, such as words, phrases, sentences, and so forth.

Different processing is done based on whether the tokenized query is a single term query, a multiple term query shorter than a certain number of tokens, or a multiple term query longer than a certain number of tokens. If the query is a single term query, then operations 806 and 808 are performed.

Operation 806 performs a semantic search using the vector table created for the document. As noted, the semantic search is performed in vector space by vectorizing the tokenized query and selecting vector results within a threshold distance from the vectorized query in vector space. The results corresponding to the vector results are the semantic search results.

Operation 808 performs a term search using the index created for the document. As noted, the term search is an exact or near exact match (if the index has been annotated with synonyms) and is performed, for example, using the prefix tree.

Operation 810 combines the search results from the semantic search and term search and removes duplicate results. In some embodiments, preference is given to the term search result so that the semantic result is removed. In other embodiments, preference is given to the semantic search result so that the term search result is removed.

Operation 812 extracts a snippet for each of the remaining search results to provide a context for the result. A snippet, for example, can comprise a segment surrounding the result, such as one or more sentences, a portion of a paragraph, and so forth. The method for extracting a snippet can locate the search result in the document and then extract the appropriate segment around the search result.

If the query is a multiple token query longer than a certain number of tokens, then a semantic search is performed over the entire tokenized query as illustrated by operation 830. To perform the semantic search, the entire tokenized query is vectorized and vector results (results in vector space) within a threshold distance from the vectorized query are selected. The results corresponding to the vector results are the semantic search results.

Operation 812 then generates appropriate snippets as previously discussed.

If the query is a multiple token query shorter than a certain number of tokens, then two different types of fanout are performed as shown in operations 818 and 820. Operation 818 performs a prefix fanout by using the index to identify the term prefixes contained in the query. For example, a prefix fanout of the phrase "tax rate" would include such things as "taxation," "taxing," and so forth. Operation 820 performs a semantic fanout by vectorizing the query and using the vector table to extract vector results within a threshold distance of the vectorized query. The search results corresponding to the vector results are then identified. For example, a semantic fanout of the term "Microsoft" may yield a term such as "MSFT," the stock ticker identifier for Microsoft.

Operation 822 generates combinations of the semantic fanout and prefix fanout results. The combinations are created by locating the respective term and semantic results within the document and combining the term and semantic results into a combination when they are within a threshold distance of each other.

Operation 824 joins the contexts for the combined term and semantic results. This is done by extracting a segment of the document surrounding the combined term and semantic results.

If there are no results, then the service falls back on the semantic search as described in operation 830. Otherwise operation 826 performs semantic validation on the joined contexts. The goal of semantic validation is to ensure that the combined contexts make sense from a semantic point of view so that the combined context represents a valid search result. Semantic validation is done by evaluating the joined contexts with a semantic model, such as by vectorizing the joined contexts and checking to ensure that the vector distance is within a threshold distance of the query. Joined contexts that are outside of the threshold distance are eliminated as results.

Operation 828 removes duplicate results as discussed above in conjunction with operation 810.

Operation 812 generates a snippet for each of the remaining results as previously described.

The results 814 are then returned for final ranking and selection. For example the results 814 may be returned to the intent and ranking services 412 for final ranking and selection before presentation to the user.

Figure 9:
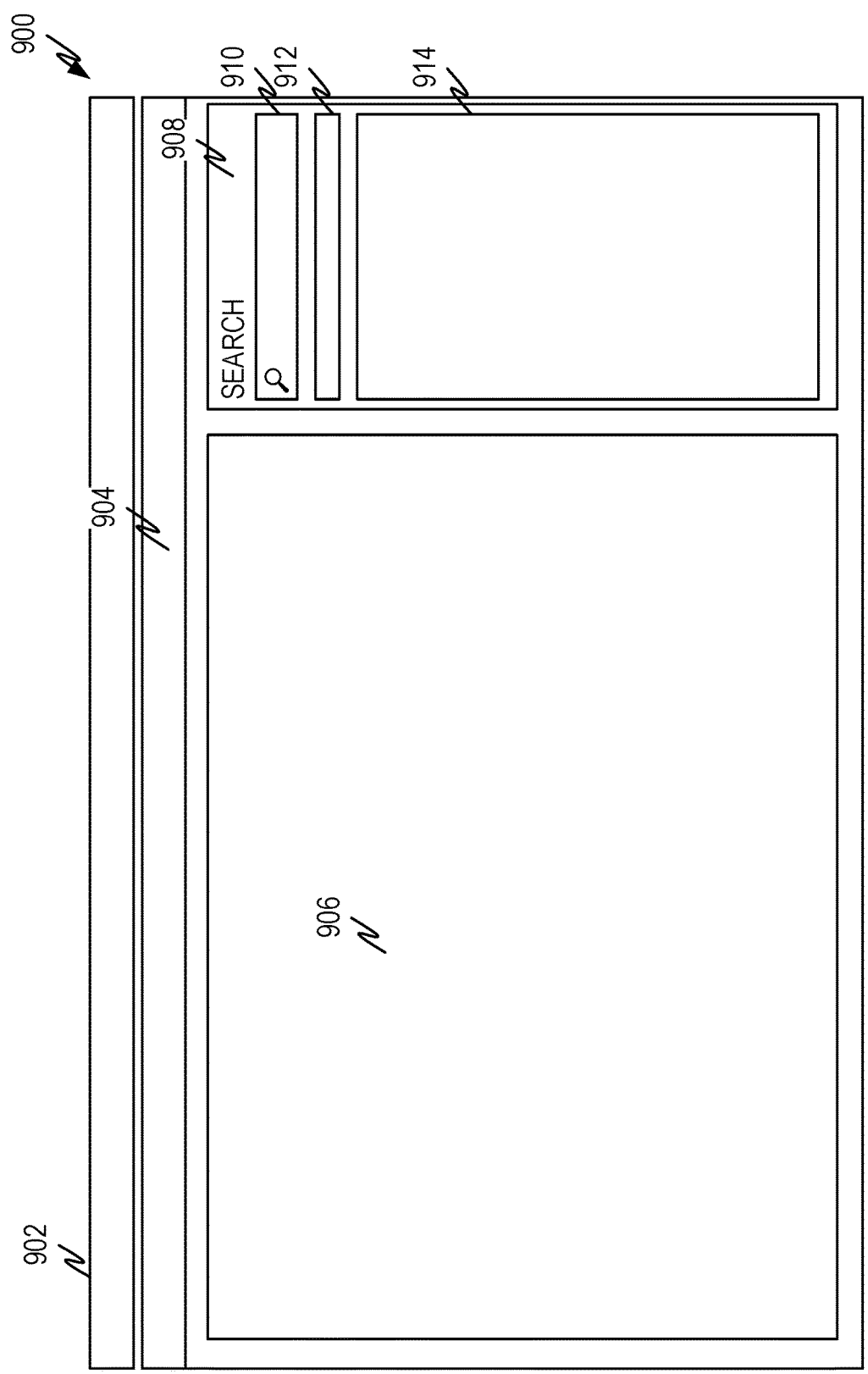
FIG. 9 illustrates an example user interface according to some aspects of the present disclosure.

FIG. 9 illustrates an example user interface 900 according to some aspects of the present disclosure. The user interface 900, for example, represents a possible in-application user interface for presenting in-application search experiences according to embodiments of the present disclosure.

The user interface can comprise the user interface of the application, such as an office productivity application. These user interfaces typically contain one region 902 where information such as the name of the document being worked on is presented. This region 902 can also comprise controls to effect the document (print, save, undo, redo, and so forth), status information about the document such as a save status, as well as controls that affect the application itself, such as controls to expand the application to full screen status, collapse the application to a task bar or otherwise temporarily suspend the application, close the application and so forth.

A second region 904 can comprise controls that the application provides to the user to access functionality provided by the application. This region can comprise menus, a ribbon, and so forth.

A third region 906 is typically taken up by the body of the opened document.

Finally, various panes and so forth can be opened and/or hidden to the sides of the document region 906. One such pane can be a search pane 908 which can be used to deliver the in-application search experience. The search pane 908 can comprise an entry region 910 where a user can enter the query to be processed.

A second region 912 can be provided to allow the user to indicate the type of search to be performed, the search services to be used and so forth. For example, the region 912 can comprise a control that would allow the user to indicate an exact term search should be performed without performing any related semantic searches. As another example, the region 912 could contain controls allowing the user to specify whether or not the user wanted a question and answer search performed. As another example, the region can contain controls to search particular types of content such as files, pictures, and so forth. As still another example, the region 912 could comprise a control that would expand the search to other search providers if the desired results were not found on the document. Additionally, or alternatively, the region could contain one or more controls that would allow the user to skip the in-application search experience altogether and go directly so another search service, such as an enterprise search service, a web search service, and so forth. Other controls and options can be provided to allow the user to tailor the search experience to include or exclude any functionality they desire.

Search results corresponding to the entered query can be presented in region 914. The results can be presented in context so that the portion of the snippet related to the query can be bolded or otherwise highlighted so the user can quickly pick out the key parts of the snippet. Additionally, each search result can be labeled with the type of result it is, such as "exact match" for term results, "related match" for semantic results, "potential answers" for question and answer results, and so forth. If the results are coming from another document and/or another provider, they can be labeled with the document, provider, and so forth to allow the user to properly understand where the results came from. Finally, as the user selects results, the document window 906 can be adjusted to display the portion of the document where the snippet is located can be found. Additionally, or alternatively, the terms in the document related to the query can be highlighted.

Figure 10:
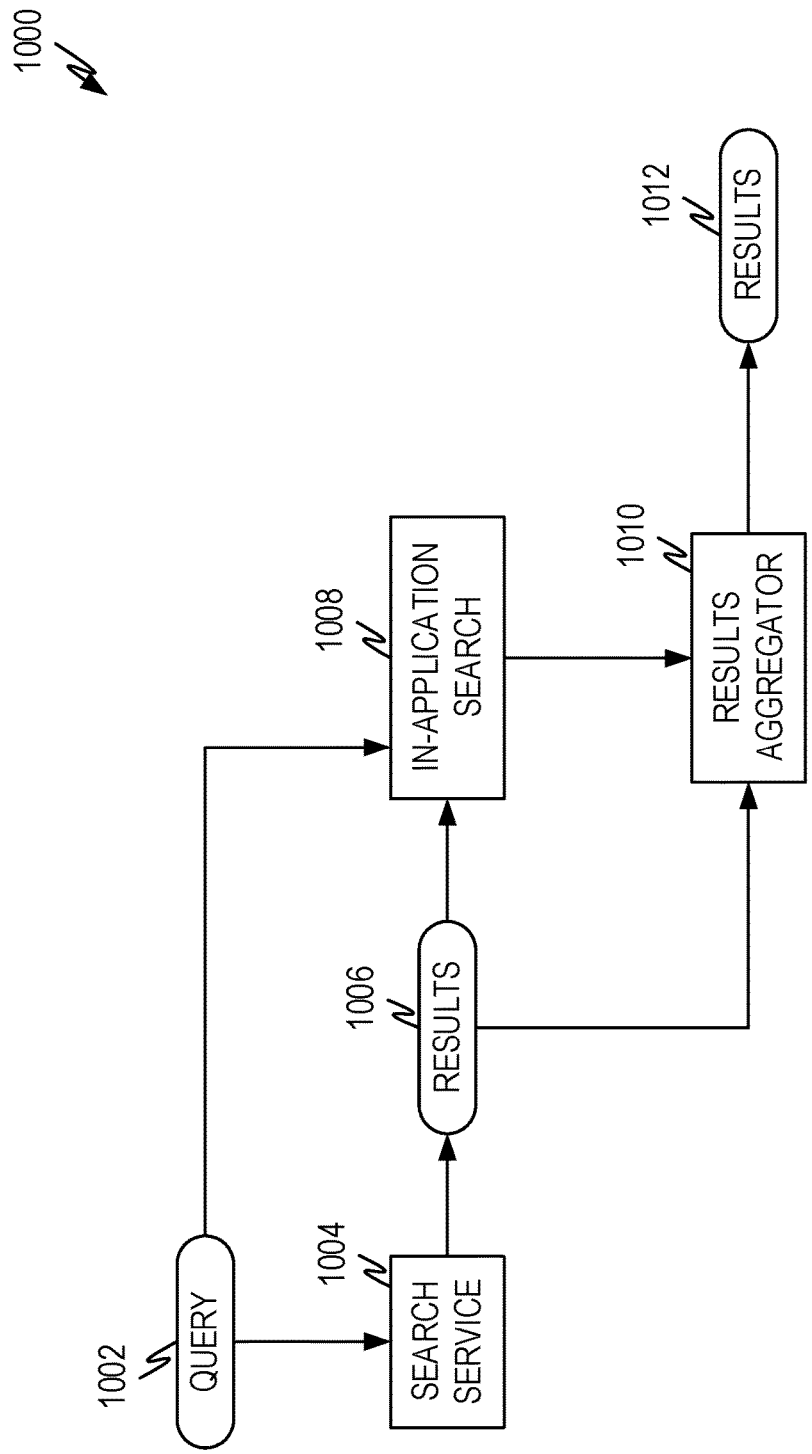
FIG. 10 illustrates an example architecture diagram according to some aspects of the present disclosure.

FIG. 10 illustrates an example architecture 1000 diagram according to some aspects of the present disclosure. The architecture 1000 illustrates how other search services can be used to institute an in-document search experience.

Query 1002 is received by the search service 1004. The search service 1004 can be any search service other than the in-application search service such as a web search service, an enterprise search service, a local search service, and so forth.

The search service 1004 identifies a set of search results 1006. The search results 1006 can be submitted to the in-application search service 1008 to search within the documents for results using the query 1002 as described herein. For example, documents corresponding to the top N search results can be submitted to the in-application search service 1008 to identify locations within the document that correspond to the query 1002.

The results 1006 from the search service 1004 as well as the results from the in-application search service 1008 can be aggregated 1012 by a results aggregator 1010 and presented to the user.

Figure 11:
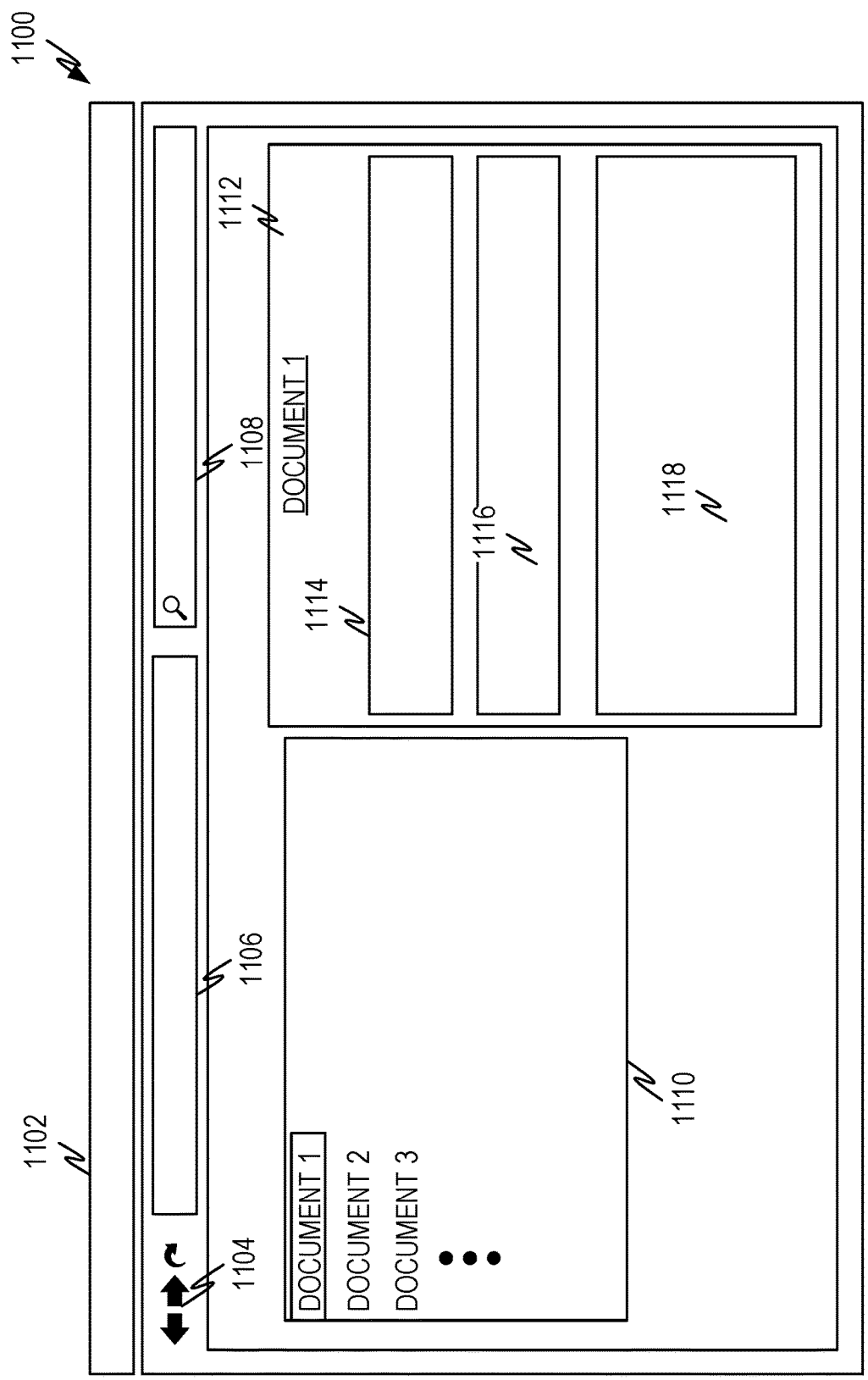
FIG. 11 illustrates an example user interface according to some aspects of the present disclosure.

FIG. 11 illustrates an example user interface 1100 according to some aspects of the present disclosure. The user interface 1100 illustrates one example of how the aggregated search results 1012 of FIG. 10 can be presented to the user.

The user interface can comprise a region 1102 that contains information and controls similar to those presented and discussed in FIG. 9, region 902. The controls 1104 can be provided to allow the user to navigate between pages of results, and so forth. Region 1106 can provide menus, a ribbon, and so forth to allow the user to access the functionality of the search service. Region 1108 allows the user to enter and submit a query to the search service such as 1004 of FIG. 10.

Region 1110 can be used to present the results 1106 from the search service 1004. For those results that were further searched by the in-application search service 1008, when one of the search results 1106 is selected, the in-application search results for that document can be presented in a separate region 1112. Thus, in the example in FIG. 11, when Document 1 is selected, the region 1112 displays the in-application search results 1114, 1116, 1118.

When a different document is selected, then the region 1112 would change to present the in-application search results for that document. If a document is selected for which in-application search results do not exist, then a "no results" message can be displayed. Along with such a message, a control that allows the user to submit the document and query to the in-application search service to produce in-application search results can be presented in some embodiments.

A further embodiment can also provide for navigation within a document based on the semantic concepts contained in the document. This embodiment can produce a "zero term" experience, which allows a user to browse semantic concepts in a document without actually entering a search term.

When a vector table is produced for a document using the processes described herein, the vector table contains the semantic concepts embodied in the document. Thus, extracting "chunks" of semantic concepts from the table would provide for a semantic index of the document. For example, a document is selected based on one or more of the methods described herein. A vector table is produced for the document, such as is described in conjunction with the contextual indexing services 424 of FIG. 4 or as otherwise described herein. Such a vector table can be produced without the user indicating that a search is to be performed.

After the vector table is performed, an entry within the vector space of the table is identified using some method, such as starting at the "beginning" of the vector table or some random location within the table. All entries within a designated distance are extracted from the table. These entries represent a single semantic concept chunk. A subset (all or part) of the entries in the chunk can then be used to represent the semantic concepts of that chunk. A second entry that is not part of the chunk is identified in the table. The process can then be repeated until all semantic concept chunks have been extracted from the document.

A user interface like that of FIG. 9 and/or FIG. 11 can then be used to present a semantic index (e.g., in the in-application search results region) comprising the different semantic chunks. The user can then navigate through the semantic concepts in the document by selecting the appropriate entry in the semantic index.

Example Machine Architecture and Machine-Readable Medium

Figure 12:
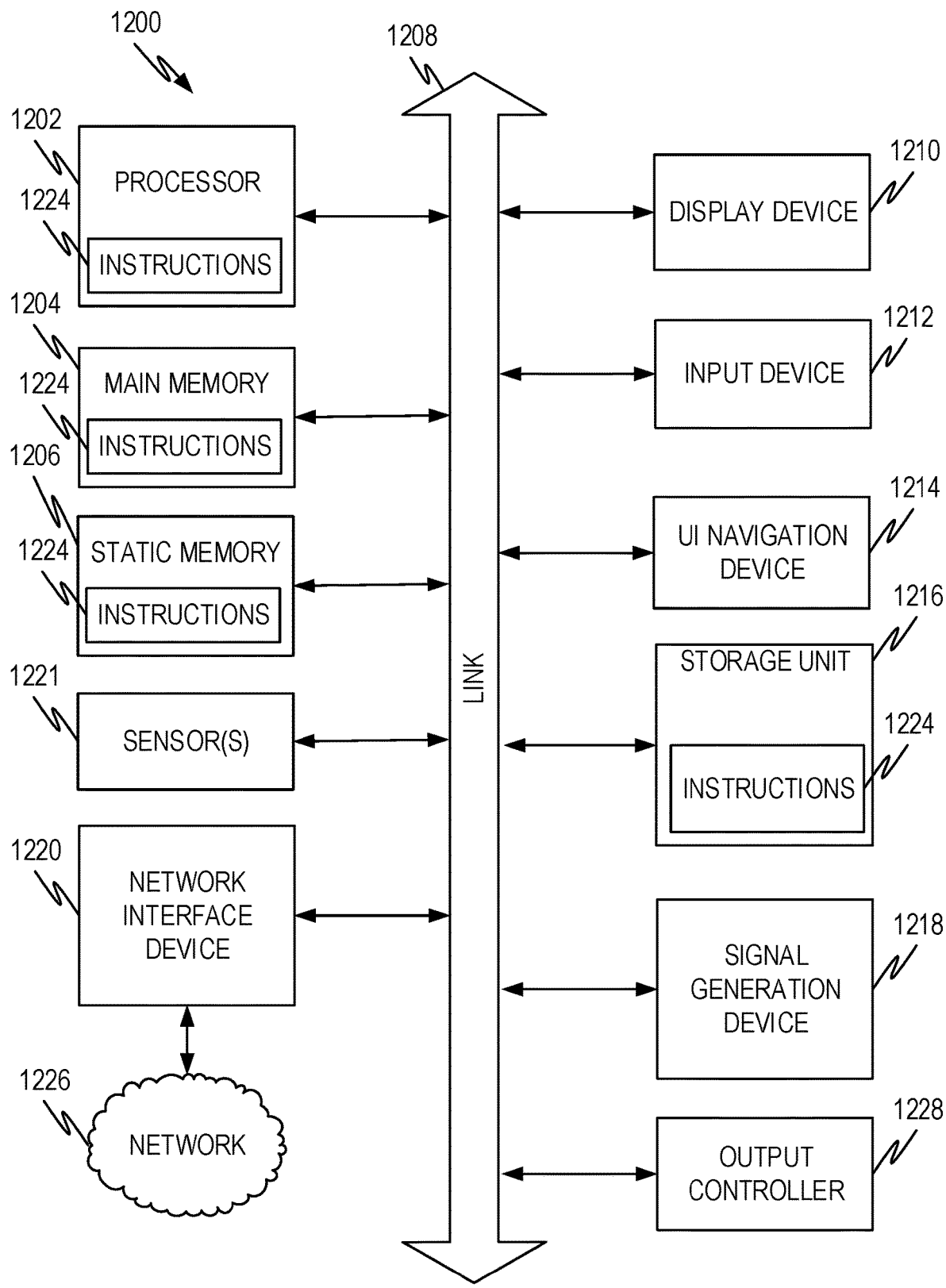
FIG. 12 illustrates a representative architecture for implementing the systems and other aspects disclosed herein or for executing the methods disclosed herein.

FIG. 12 illustrates a representative machine architecture suitable for implementing the systems and so forth or for executing the methods disclosed herein. The machine of FIG. 12 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 12 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1200 includes at least one processor 1202 (e.g., a central processing unit (CPU), a graphics processing unit (GPU), advanced processing unit (APU), or combinations thereof), one or more memories such as a main memory 1204, a static memory 1206, or other types of memory, which communicate with each other via link 1208. Link 1208 may be a bus or other type of connection channel. The machine 1200 may include further optional aspects such as a graphics display unit 1210 comprising any type of display. The machine 1200 may also include other optional aspects such as an alphanumeric input device 1212 (e.g., a keyboard, touch screen, and so forth), a user interface (UI) navigation device 1214 (e.g., a mouse, trackball, touch device, and so forth), a storage unit 1216 (e.g., disk drive or other storage device(s)), a signal generation device 1218 (e.g., a speaker), sensor(s) 1221 (e.g., global positioning sensor, accelerometer(s), microphone(s), camera(s), and so forth), output controller 1228 (e.g., wired or wireless connection to connect and/or communicate with one or more other devices such as a universal serial bus (USB), near field communication (NFC), infrared (IR), serial/parallel bus, etc.), and a network interface device 1220 (e.g., wired and/or wireless) to connect to and/or communicate over one or more networks 1226.

Executable Instructions and Machine-Storage Medium

The various memories (i.e., 1204, 1206, and/or memory of the processor(s) 1202) and/or storage unit 1216 may store one or more sets of instructions and data structures (e.g., software) 1224 embodying or utilized by any one or more of the methodologies or functions described herein. These instructions, when executed by processor(s) 1202 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

Example Embodiments

Example 1. A method for in-application search, comprising:
  receiving an indication that a user desires to search for content within a document;
  responsive to the indication, building an index for the document and a vector table for the document, the index comprising information for term searching and the vector table comprising information for semantic searching;
  performing a term search for a query from the user based upon the index;
  performing a semantic search for a query from the user based upon the vector table;
  aggregating search results from both the term search and the semantic search;
  select a subset of aggregated search results; and
  present the subset to the user.

Example 2. The method of example 1 further comprising:
  identifying a context snippet for a second subset of the aggregated search results;
  sending the context snippets and the query to a trained machine learning model;

receiving from the trained machine learning model a quick answer;
presenting the quick answer as part of the subset of results.

Example 3. The method of example 1 wherein prior to building the index and vector table:
determining whether an existing index for the document and an existing vector table for the document are available;
determining whether the document has been modified since the existing index and the existing vector table were created;
responsive to determining that an existing index and an existing vector table are available and to determining that the document has not been modified, skipping building the index and vector table and using the existing index for the term search and the existing vector table for the semantic search.

Example 4. The method of example 1 further comprising:
determining a number of results in the subset of search results;
responsive to the number falling below a threshold number of results:
identifying a secondary search provider;
invoking the secondary search provider with the query.

Example 5. The method of example 4 further comprising:
receiving a second set of search results from the secondary search provider;
presenting a subset of the second set of search results to the user.

Example 6. The method of example 4 further comprising:
receiving selection of a second document from the secondary search provider;
building a second index for the second document and a second vector table for the second document, the second index comprising information for term searching and the second vector table comprising information for semantic searching;
performing a second term search for the query based upon the second index;
performing a second semantic search for the query based upon the second vector table;
aggregating second search results from both the second term search and the second semantic search;
select a second subset of the aggregated second search results; and
sending the second subset to the secondary search provider.

Example 7. The method of example 1 wherein performing the semantic search comprises:
determining a length of the query;
responsive to determining that the length is greater than a threshold, performing a semantic search using the query.

Example 8. The method of example 7 further comprising:
responsive to determining that the length is not greater than the threshold:
perform a prefix fanout on a subset of terms in the query;
perform a semantic fanout on a subset of the query;
generate combinations from the prefix fanout and the semantic fanout;
join context locations for the generated combinations;
determine whether a number of context locations falls below a second threshold;
responsive to determining that the number of context locations does not fall below the second threshold, semantically validate the joined context locations; and
responsive to determining that the number of context locations does fall below the second threshold, performing a semantic search using the query.

Example 9. The method of example 1 further comprising:
saving the index and the vector table for later use.

Example 10. The method of example 1 wherein the index comprises a prefix tree and wherein the vector table is created by vectorizing the document at a plurality of levels.

Example 11. The method of example 1 further comprising:
determining whether an existing index for the document and an existing vector table for the document are available;
responsive to determining that an existing index and an existing vector table are available:
skipping building the index and vector table, and using the existing index for the term search and the existing vector table for the semantic search.

Example 12. The method of example 1 wherein the indication comprises receiving the query or an indication that the user has interacted with a search box control.

Example 13. The method of example 1 wherein the indication comprises receiving identification of the document from a secondary search service.

Example 14. An apparatus comprising means to perform a method as exampled in any preceding example.

Example 15. Machine-readable storage including machine-readable instructions, when executed, to implement a method or realize an apparatus as exampled in any preceding example.

Example 16. A method for in-application search, comprising:
receiving an indication that a user desires to search for content within a document;
responsive to the indication, building an index for the document and a vector table for the document, the index comprising information for term searching and the vector table comprising information for semantic searching;
performing a term search for a query from the user based upon the index;
performing a semantic search for a query from the user based upon the vector table;
aggregating search results from both the term search and the semantic search;
select a subset of aggregated search results; and
present the subset to the user.

Example 17. The method of example 16 further comprising:
identifying a context snippet for a second subset of the aggregated search results;
sending the context snippets and the query to a trained machine learning model;
receiving from the trained machine learning model a quick answer;
presenting the quick answer as part of the subset of results.

Example 18. The method of example 16 or 17 wherein prior to building the document index and vector table:
determining whether an existing index for the document and an existing vector table for the document are available;
determining whether the document has been modified since the existing index and the existing vector table were created;
responsive to determining that an existing index and an existing vector table are available and to determining that the document has not been modified, skipping building the index and vector table and using the existing index for the term search and the existing vector table for the semantic search.

Example 19. The method of example 16, 17, or 18 further comprising:
determining a number of results in the subset of search results;
responsive to the number falling below a threshold number of results:
identifying a secondary search provider;
invoking the secondary search provider with the query.

Example 20. The method of example 19 further comprising:
receiving a second set of search results from the secondary search provider;
presenting a subset of the second set of search results to the user.

Example 21. The method of example 19 further comprising:
receiving selection of a second document from the secondary search provider;
building a second index for the second document and a second vector table for the second document, the second index comprising information for term searching and the second vector table comprising information for semantic searching;
performing a second term search for the query based upon the second index;
performing a second semantic search for the query based upon the second vector table;
aggregating second search results from both the second term search and the second semantic search;
select a second subset of the aggregated second search results; and
sending the second subset to the secondary search provider.

Example 22. The method of example 16, 17, 18, 19, 20, or 21 wherein performing the semantic search comprises:
determining a length of the query;
responsive to determining that the length is greater than a threshold, performing a semantic search using the query.

Example 23. The method of example 22 further comprising:
responsive to determining that the length is not greater than the threshold:
perform a prefix fanout on a subset of terms in the query;
perform a semantic fanout on a subset of the query;
generate combinations from the prefix fanout and the semantic fanout;
join context locations for the generated combinations;
determine whether a number of context locations falls below a second threshold;
responsive to determining that the number of context locations does not fall below the second threshold, semantically validate the joined context locations; and
responsive to determining that the number of context locations does fall below the second threshold, performing a semantic search using the query.

Example 24. The method of example 16, 17, 18, 19, 20, 21, 22, or 23 further comprising:
saving the index and the vector table for later use.

Example 25. The method of example 11, 12, 13, 14, 15, 16, 17, 18, or 19 wherein the index comprises a prefix tree and wherein the vector table is created by vectorizing the document at a plurality of levels.

Example 26. A system comprising a processor and computer executable instructions, that when executed by the processor, cause the system to perform operations comprising:
receiving identification of a document;
receiving a query to be used to search the document;
determining whether an existing index for the document and an existing vector table for the document are available;
determining whether the document has been modified since the existing index and the existing vector table were created;
responsive to determining that an existing index and an existing vector table are not available or to determining that the document has been modified:
building an index for the document and a vector table for the document, the index comprising information for term searching and the vector table comprising information for semantic searching;
performing a term search for a query from a user based upon the index;
performing a semantic search for a query from the user based upon the vector table;
aggregating search results from both the term search and the semantic search;
select a subset of aggregated search results; and
present the subset to the user.

Example 27. The system of example 26 further comprising:
identifying a context snippet for a second subset of the aggregated search results;
sending the context snippets and the query to a trained machine learning model;
receiving from the trained machine learning model a quick answer;
presenting the quick answer as part of the subset of results.

Example 28. The system of example 26 or 27 further comprising:
responsive to determining that an existing index and an existing vector table are available and to determining that the document has not been modified:
performing a term search for a query from the user based upon the existing index;
performing a semantic search for a query from the user based upon the existing vector table;
aggregating search results from both the term search and the semantic search;
select a subset of aggregated search results; and
present the subset to the user.

Example 29. The system of example 26, 27, or 28 further comprising:
determining a number of results in the subset of search results;
responsive to the number falling below a threshold number of results:
identifying a secondary search provider;
invoking the secondary search provider with the query.

Example 30. The system of example 29 further comprising:
receiving a second set of search results from the secondary search provider;
presenting a subset of the second set of search results to the user.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for in-application search, comprising:
receiving, by way of a productivity application, an indication that a user desires to search for content within a document that is being presented to the user in a graphical user interface of the productivity application;
responsive to the indication, building an index for the document, wherein the index comprises terms within the document;
responsive to the indication, building a vector table for the document, wherein the vector table comprises vectors that represent semantics of the terms within the document;
performing a first search over the index for the document based upon a query from the user;
performing a second search over the vector table based upon the query from the user, wherein performing the second search comprises determining a length of the query, wherein the second search is performed when the length of the query is determined to be greater than a threshold;
generating a search result based upon the first search and the second search; and
returning the search result to the user.

2. The method of claim 1 further comprising:
identifying a context snippet in the search result;
sending the context snippet and the query to a trained machine learning model;
receiving from the trained machine learning model a quick answer; and
returning the quick answer to the user.

3. The method of claim 1, further comprising:
prior to building the index and vector table:
determining whether an existing index for the document and an existing vector table for the document are available;
determining whether the document has been modified since the existing index and the existing vector table were created; and
building the index and the vector table responsive to determining that an existing index and an existing vector table are available and further responsive to determining that the document has been modified.

4. The method of claim 1, wherein several search results are generated based upon the first search and the second search, the method further comprising:
determining a number of results in the several search results; and
responsive to the number falling below a threshold number of results:
identifying a secondary search provider; and
invoking the secondary search provider with the query.

5. The method of claim 4 further comprising:
receiving a second search result from the secondary search provider; and
presenting the second search result to the user.

6. The method of claim 4 further comprising:
receiving selection of the second search result, where the second search result represents a second document;
building a second index for the second document and a second vector table for the second document, the second index comprising information for term searching and the second vector table comprising information for semantic searching;
performing a third search over the second index for the query;
performing a fourth search over the second vector table based upon the query;
generating a third search result based upon the third search and the fourth search; and
returning the third search result to the user.

7. The method of claim 1 further comprising:
responsive to determining that the length is not greater than the threshold:
performing a prefix fanout on a subset of terms in the query;
performing a semantic fanout on a subset of the query;
generating combinations from the prefix fanout and the semantic fanout;
joining context locations for the generated combinations;
determining whether a number of context locations falls below a second threshold;
responsive to determining that the number of context locations does not fall below the second threshold, semantically validating the joined context locations; and
responsive to determining that the number of context locations does fall below the second threshold, performing the second search using the query.

8. The method of claim 1 further comprising:
saving the index and the vector table for later use.

9. The method of claim 1 wherein the index comprises a prefix tree and wherein the vector table is created by vectorizing the document at a plurality of levels.

10. A system comprising a processor and computer executable instructions, that when executed by the processor, cause the system to perform operations comprising:
receiving, by way of a productivity application, identification of a document that is being presented in a graphical user interface of the productivity application;
receiving a query to be used to search the document;
subsequent to receiving the query:
building an index for the document, wherein the index includes terms within the document;
building a vector table for the document, wherein the vector table comprises semantic representations of the terms within the document;
performing a first search over the index based upon a query from the user;
performing a second search over the vector table based upon the query from the user, wherein performing the second search comprises determining a length of the query wherein the second search is performed when the length is determined to be greater than a threshold;
generating first search results based upon the first search;
generating second search results based upon the second search;
aggregating the first search results and the second search results to form aggregated search results;
selecting a search result from the aggregated search results; and
presenting the search result to the user.

11. The system of claim 10, the operations further comprising:
   identifying a context snippet for a second search result in the aggregated search results;
   sending the context snippet and the query to a trained machine learning model;
   receiving from the trained machine learning model a quick answer; and
   presenting the quick answer to the user.

12. The system of claim 10, wherein the query is received by way of the graphical user interface of the productivity application.

13. The system of claim 11, the operations further comprising:
   determining a number of results in the aggregated search results;
   responsive to the number falling below a threshold number of results:
      identifying a secondary search provider;
      invoking the secondary search provider with the query.

14. The system of claim 13, the operations further comprising:
   receiving a second search result from the secondary search provider;
   presenting the second search result to the user.

15. The system of claim 13, wherein the search result and the second search result are presented in the graphical user interface of the productivity application.

16. The system of claim 10, the operations further comprising:
   responsive to determining that the length of the query is not greater than the threshold:
      performing a prefix fanout on a subset of terms in the query;
      performing a semantic fanout on a subset of the query;
      generating combinations from the prefix fanout and the semantic fanout;
      joining context locations for the generated combinations; and
      determining whether a number of context locations falls below a second threshold, wherein the second search is performed responsive to determining that the number of context locations does not fall below the second threshold.

17. A computer storage medium comprising executable instructions that, when executed by a processor of a machine, cause the machine to perform operations comprising:
   receiving, by way of a productivity application, an indication that a user desires to search for content within a document that is being presented to the user in a graphical user interface of the productivity application;
   responsive to the indication, building an index for the document, wherein the index comprises terms within the document;
   responsive to the indication, building a vector table for the document, wherein the vector table comprises vectors that represent semantics of the terms within the document;
   performing a first search over the index for the document based upon a query from the user;
   performing a second search over the vector table based upon the query from the user, wherein performing the second search comprises determining a length of the query, wherein the second search is performed when the length of the query is determined to be greater than a threshold;
   generating a search result based upon the first search and the second search; and
   returning the search result to the user.

18. The computer storage medium of claim 17, the operations further comprising:
   identifying a context snippet in the search result;
   sending the context snippet and the query to a trained machine learning model;
   receiving from the trained machine learning model a quick answer; and
   returning the quick answer to the user.

19. The computer storage medium of claim 17, the operations further comprising:
   responsive to determining that the length of the query is not greater than the threshold:
      performing a prefix fanout on a subset of terms in the query;
      performing a semantic fanout on a subset of the query;
      generating combinations from the prefix fanout and the semantic fanout;
      joining context locations for the generated combinations; and
      determining whether a number of context locations falls below a second threshold;
      responsive to determining that the number of context locations does not fall below the second threshold, semantically validating the joined context locations; and
      responsive to determining that the number of context locations does fall below the second threshold, performing the second search using the query.

20. The system of claim 16, the operations further comprising:
   semantically validating the joined context locations responsive to determining that the number of context locations does not fall below the second threshold.

* * * * *